United States Patent [19]

Rushing et al.

[11] 3,732,357

[45] May 8, 1973

[54] SELF-STARTING SYNCHRONOUS INTEGRATED MOTOR-WHEEL DRIVE

[75] Inventors: Frank C. Rushing, Ellicott City; Robert R. Aulthouse, Linthicum Heights, both of Md.

[73] Assignee: Westinghouse Electric Corporation, Pittsburgh, Pa.

[22] Filed: Nov. 10, 1971

[21] Appl. No.: 197,304

[52] U.S. Cl. ....................178/5.4 CF

[51] Int. Cl. ....................H04n 9/00

[58] Field of Search ....................178/5.2 R, 5.4 R, 178/5.4 CF, 7.86

[56] References Cited

UNITED STATES PATENTS

| | | | |
|---|---|---|---|
| 2,312,800 | 3/1943 | Cawein | 178/5.4 R |
| 2,329,194 | 9/1943 | Goldmark | 178/5.4 CF |

*Primary Examiner*—Howard W. Britton
*Assistant Examiner*—George G. Stellar
*Attorney*—F. H. Henson et al.

[57] ABSTRACT

A color filter wheel for a color television system is integrated into a motor to decrease size and weight, and to minimize noise associated with bearings and gears. The wheel is rotatably mounted on a frame and has rotor poles mounted concentrically about its axis of rotation and stator poles mounted on the frame in operative spaced relationship to the rotor poles. Different pairs of stator poles are sequentially aligned with different pairs of rotor poles as the wheel rotates and are sequentially energized by a pulsating DC source for causing rotation of the filter wheel. Means are provided for varying the frequency of the pulsating DC source for ease of starting the wheel and for synchronizing the wheel rotation with the scanning frames of the television camera.

18 Claims, 4 Drawing Figures

SELF-STARTING SYNCHRONOUS INTEGRATED MOTOR-WHEEL DRIVE

BACKGROUND OF THE INVENTION

Field of the Invention

This invention relates to drives for color filter wheels used in color television systems and the like. In one of its aspects, the invention relates to a motor for driving a color television wheel. In another of its aspects the invention relates to a color television system with an improved means for rotating a color filter wheel in front of the television camera.

One well-known system for producing color television pictures uses a wheel having primary color filters which are rotated in front of the television camera to interrupt the light input to the camera in synchronism with the electronic scanning of each frame. This system has found use in aero-space applications where weight and compactness are important factors. A conventional system of mounting and driving the color wheel is illustrated schematically in FIG. 1 to which reference is now made. A support 12 has mounted thereon a hysteresis-type synchronous motor 14 having a drive shaft 18 rigidly mounting a pinion gear 16. An idler gear 20 meshes with the pinion gear 16 and has a shaft 22 which is mounted on a bracket 24. A color wheel 26 having a toothed outer edge 28 which meshes with the idler gear 20 has a shaft 32 which is mounted on a bracket 34 on the support 12. A plurality of colored filter sections are arranged radially around the wheel 26. A television camera 36 is mounted on the support 12 and has a lens 38 which is set to receive light passing through the filters 30 on the color wheel 26. The motor 14 is driven in synchronism to the electronic scanning of the camera 36 to drive pinion 16 which in turn drives idler gear 20 and the color wheel 26. Each of the gears, including the color wheel, requires a pair of bearings for proper mounting. The action of the bearings, the meshing of the three gears and the operation of the motor all produce noise which result in microphonic problems in the picture tube. This noise is difficult to eliminate, even with the use of rubber insulation.

In addition to the noise problem other factors make the drive system undesirable for aero-space applications. The synchronous motor requires a rather large power input of about 6 to 12 watts. In addition, the motor and the gear assembly are heavy and bulky.

BRIEF STATEMENT OF THE INVENTION

According to the invention, the weight, power requirements, and noise associated with the mounting and drive of the color wheel are greatly reduced by integrating an electric drive motor about the perimeter of the color filter wheel. A stator extends a portion of the distance around the outside of the wheel and has a plurality of poles which are alternately energized, preferably by a pulsating DC current. The wheel has a plurality of magnetically responsive poles concentrically spaced about its mounting axis and is rotated by the sequential activation of the stator poles. Preferably, the pulsating DC current has means for adjusting the frequency for efficient starting of the motor.

The inventive system thus eliminates three gears as compared with the conventional system and reduces the bearing requirements to two. Further, the power requirements to drive the color wheel and the assembly weight are substantially diminished.

DETAILED DESCRIPTION OF THE PREFERRED EMBODIMENT

Figure 2:
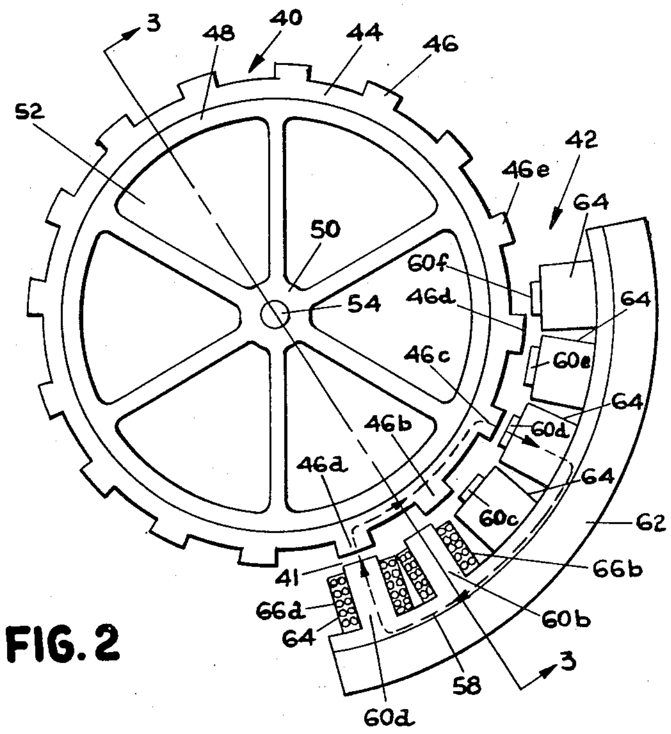
FIG. 2 is a plan view, partly in section, of a color wheel mounting drive according to the invention.
Figure 3:
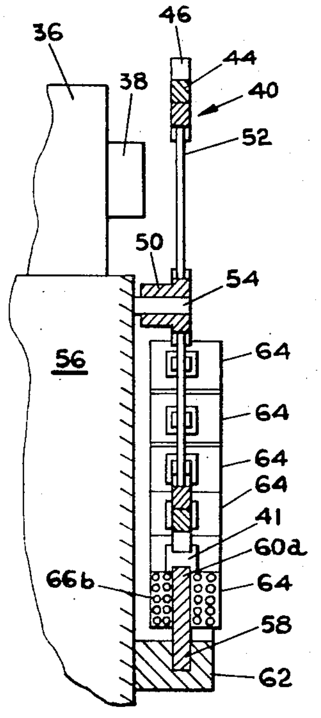
FIG. 3 is a view taken along lines 3—3 of FIG. 2.

Referring now to FIGS. 2 and 3, there is shown a rotary color filter wheel 40 and a stator 42 positioned at a circumferential edge of the wheel 40 and spaced therefrom by an air gap 41. The olor wheel 40 has an iron band 44 around the circumference thereof linking a plurality of rotor poles 46 which project radially from the outer edge of the band 44. For purposes of illustration,, certain of the poles have been designated as poles *46a*, *46b*, *46c*, *46c*, and *46e*. A color filter housing 48 has a hub 50 which is rotatably supported on a shaft 54 secured to support 56. Bearings (not shown) can be provided between the hub 50 and shaft 54. A plurality of color filters 52 are mounted in radial openings in the housing 48.

The stator 42 comprises an arc-shaped iron rim 58 having a plurality of stator poles 60 projecting radially inwardly and concentrically mounted with respect to the rotational axis of the wheel 40. For purposes of illustration, the poles have been labelled *60a*, *60b*, *60c*, *60d*, *60e*, and *60f*. The iron rim 58 is mounted to the support 56 by a bracket 62. The stator poles extend about 90° about the circumference of the wheel although the angular arrangement of the poles about the wheel 40 can be chosen to suit the use of the drive. In this particular embodiment, it is desirable for the stator elements to extend only a portion of the distance around the wheel to minimize size of the unit and to leave the top portions of the wheel free for unobstructed filtering in front of the lens 38 of a camera 36. Preferably, the arc formed by the stator elements is less than 180°.

Each of the stator poles 60 has surrounding it an electrical coil 66. For purposes of illustration, the coils have been individually labelled *66a*, *66b*, *66c*, *66d*, *66e*, and *66f* which surround respectively stator poles *60a*, *60b*, *60c*, *60d*, *60e*, and *60f*.

Figure 4:
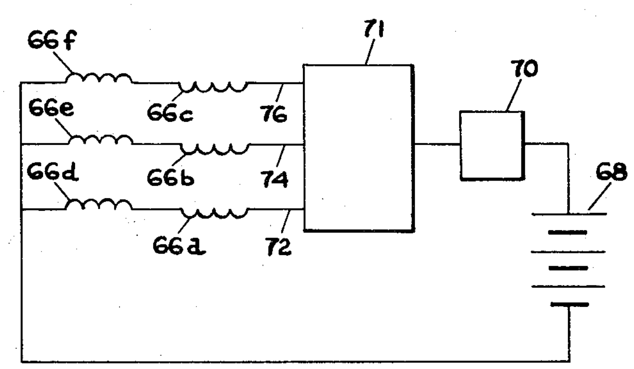
FIG. 4 is a schematic electrical diagram of the electrical system employed in the drive system illustrated in FIGS. 2 and 3.

Referring now to FIG. 4, there is illustrated the electrical system for the invention. A DC source 68 is coupled to a variable rate pulse generator 70, such as an oscillator, which delivers a pulsed signal to a ring counter 71. Output leads 72, 74, and 76 from the pulse generator 70 are sequentially energized by the ring counter in response to the pulsed input from the generator 70. Lead 72 is connected in series with coils *66a* and *66d*. Lead 74 is connected in series with coils *66b* and *66e* and output lead 76 is connected in series with coils *66c* and *66f*. The generator 70 is adjustable so that the frequency of the pulses varies from about 30 pulses per second to about 500 pulses per second.

In operation of the device illustrated in FIGS. 2 through 4, the color wheel 40 is mounted for free rotation on the shaft 54. As can be seen from the drawings, alternate poles 46*a* and 46*c* of the rotor band 44 are aligned with first and fourth stator poles 60*a* and 60*d*. On the other hand, rotor pole 46*b* is positioned between the stator poles 60*e* and 60*f*. When the pulse generator 70 is turned on, a pulse is sent to ring counter 71 which in turn energizes lead 72 so that the current passes through coils 66*a* and 66*d*. This energization sets up a magnetic force on rotor poles 46*a* and 46*c* to align rotor poles 46*a* and 46*c* with stator poles 60*a* and 60*d*, respectively. As illustrated by the dotted line in FIG. 2, the magnetic flux makes a circular loop between stator pole 60*a*, rotor pole 46*a*, iron band 44, rotor pole 46*c*, stator pole 60*d* and iron ring 58. When the ring counter 71 is pulsed again lead 74, and coils 66*b* and 66*e* are energized. A magnetic force in stator poles 60*b* and 60*e* attracts rotor poles 46*b* and 46*d*, respectively, to move into alignment therewith. At this time, lead 72 and coils 66*a* and 66*d* are de-energized. Thus, the wheel will tend to rotate in a clockwise direction as viewed in FIG. 2. As the rotor poles 46*b* and 46*d* move into alignment with stator poles 60*b* and 60*e*, respectively, the rotor pole 46*c* will be positioned between opposing stator poles and rotor pole 46*e* will be angularly spaced from stator pole 60*f*. When the ring counter 71 is pulsed again, lead 76 and coils 66*c* and 66*f* are energized. A magnetic force in pole 60*c* attracts the rotor pole 46*c*. Likewise, the stator pole 60*f* attracts the rotor pole 46*e* so that the wheel 40 continues to rotate clockwise as the ring counter 71 sequentially energizes leads 72, 74, and 76. The operation described above takes place very rapidly so that the wheel rotates at a high speed.

Upon starting, the frequency of the operation must be slower than after the wheel has developed momentum. It has been found in a test model that an initial frequency of about 30 pulses per second is sufficient to initiate rotation of the wheel 40. The frequency of the pulses upon being increased to about 480 pulses per second, produces a rotational speed of the wheel 40 of about 600 rpm.

The speed of the wheel 40 is dependent on the scanning speed of the camera 36. Thus, the pulse frequency, or pulse repetition rate of the oscillator 70 is synchronized with the electronic scanning frequency of the camera so that the successive filters 52 are presented in front of the camera in synchronism with the frame scanning rate. This readily may be accomplished by means well known in the art. In addition to synchronized operation, the successive, different color filters must be presented in a proper, ordered sequence coordinated with the corresponding scanning frames. Assuming the filters 52 to be properly ordered, therefore, the coordinated presentation may be accomplished by slowing down the speed of the wheel slightly to change the relationship between filters and the scanning of the camera, and then bringing the wheel up to synchronized speed of the camera. The speed control may be accomplished in any suitable way, for example, by adjusting the pulse repetition rate of the output of oscillator 70. The procedure is repeated until the desired color filter is synchronized with a particular scanning frame.

Figure 1:
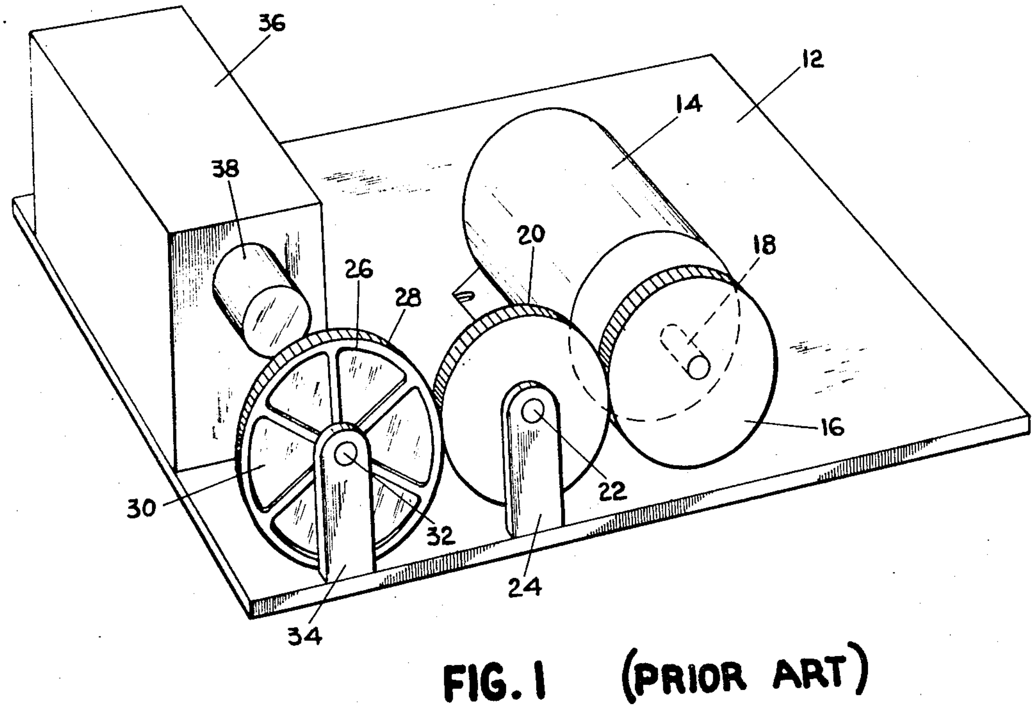
FIG. 1 (PRIOR ART)
FIG. 1 is a schematic representation of a conventional system for mounting a color wheel for a television camera and has been described above.

The invention described above provides a simplified and lighter drive for a color wheel. The drive reduces the bearing equipment from six to two, as compared with the aforedescribed prior art system; further, meshing gears have been eliminated. These two factors afford a substantial reduction in noise from the drive system. In addition, the power requirements of the inventive system are substantially less than the conventional system described with reference to FIG. 1. The synchronous motor known to have high losses associated therewith, has been eliminated. It has been found that the inventive system described above in FIGS. 2 through 4 has power requirements of about one watt with a maximum of 2 to 3 watts, as compared with 6 to 12 watts for the conventional system.

The color wheel mounting system is very compact in size and for this reason takes up less space. Elimination of the synchronous motor and the meshing gears reduces the weight of the drive. These two factors make the inventive system more desirable for applications such as portable television cameras where size and weight are important.

The invention has been described with respect to a stator having six poles extending approximately 90° about the circumference of the circle. It is obvious that more poles or conceivably even fewer poles can be used and spaced further about the circumference of the rotor in any operable fashion. Further, the rotor poles have been illustrated as mounted about the circumference of the wheel. Other mountings in which the motor poles are arranged concentrically with the axis of rotation of the wheel can also be employed.

Reasonable variation and modification are possible within the scope of the foregoing disclosure, the drawings, and appended claims without departing from the spirit of the invention.

What is claimed is:

1. In a color television system in which a wheel having a plurality of radially spaced color filters is rotatably mounted on an axis in front of a television camera and drive means rotate said wheel so that said color filters interrupt the light input to the camera in synchronism with the electronic scanning of each frame of said camera; the improvement in said drive means comprising:
   - rotor elements mounted concentrically with said axis of rotation around the periphery of said wheel;
   - stator elements fixedly mounted with respect to said wheel and concentric with said axis of rotation of said wheel, said stator elements being spaced from said rotor elements by an air gap; and
   - means to sequentially magnetize said stator elements to cause rotation of said wheel about its mounting axis.

2. A color television system according to claim 1 wherein said stator elements form an arc about said axis of rotation of said wheel.

3. A color television system according to claim 2 wherein said stator elements form an arc of less than 180°.

4. A color television system according to claim 1 wherein said rotor and stator elements are so spaced that a torque results when said stator elements are sequentially energized.

5. A color television system according to claim 1 wherein said rotor elements include a plurality of poles of magnetizable material spaced about the circumference of said wheel; and said stator elements include a plurality of magnetizable poles aligned with said rotor poles as said wheel rotates, said stator poles being spaced such that different pairs of wheel and stator poles are sequentially aligned as said wheel rotates.

6. A color television system according to claim 5 wherein said magnetizing means comprise a DC source, a coil surrounding each of said stator poles, and means for sequentially coupling said DC source to said coils surrounding said stator poles.

7. A color television system according to claim 6 and further comprising means for varying the frequency of coupling said stator pole coils with said DC source.

8. A color television system according to claim 5 wherein two of said pairs of said wheel and stator poles are aligned during a given time interval so that the magnetic flux resulting from energized stator poles follows a closed loop through two of said rotor poles and two of said stator poles.

9. A color television system according to claim 8 wherein there are at least three sets of stator poles which are sequentially magnetized during each cycle.

10. A color television system according to claim 5 wherein there are at least three stator poles which are sequentially energized during each cycle.

11. A color television system according to claim 1 wherein said rotor elements are mounted about the circumference of said wheel.

12. In an apparatus for use in connection with television cameras for producing color pictures, said apparatus comprising:

a frame;

a wheel having a plurality of colo filters arranged radially about said wheel;

means mounting said wheel on said frame for rotational movement about a central axis thereof; and means for rotatably driving said wheel about said axis;

the improvement in said rotatable driving means comprising;

magnetizable rotor elements mounted around the periphery of said wheel concentrically with said central axis;

stator elements mounted on said frame and arranged in an arc shape, said stator elements being operably spaced from said rotor elements by an air gap;

means for sequentially magnetizing said stator elements; and said stator elements being so spaced from each other that said sequential energizing of said stator elements produces a torque between different pairs of rotor and stator elements, thereby causing rotation of said wheel.

13. An apparatus according to claim 12 wherein said stator elements are connected by a magnetizable material and said rotor elements are connected by a magnetizable material, and wherein said stator elements are magnetized in pairs so that a circular flux path is formed between each magnetized pair of stator elements and a corresponding pair of rotor elements.

14. An apparatus according to claim 12 wherein said magnetizing means includes a DC source, a magnetizing coil surrounding each of said stator elements, and means sequentially coupling said DC source to said magnetizing coils.

15. An apparatus according to claim 14 and further comprising means to vary the frequency of said sequential coupling means so that said wheel can be started at a relatively low frequency of magnetizing said coils and thereafter brought up to a higher speed for synchronization with a television camera.

16. An apparatus according to claim 12 wherein said rotor elements are circumferentially spaced about said wheel.

17. An apparatus according to claim 12 wherein said stator elements form an arc of less than 180°.

18. An apparatus according to claim 12 wherein said stator elements form an arc of about 90°.

* * * * *